United States Patent
Healy et al.

(10) Patent No.: US 9,785,326 B2
(45) Date of Patent: Oct. 10, 2017

(54) DEFINING AND TRACKING AN INTERACTIVE USER INTERFACE

(71) Applicant: Proscape Technologies, Inc., Horsham, PA (US)

(72) Inventors: Timothy M. Healy, Horsham, PA (US); Derek H. Pollock, Horsham, PA (US); Sanjeev J. Surati, Horsham, PA (US); Michael A. McCloskey, Horsham, PA (US)

(73) Assignee: Proscape Technologies, Inc., Horsham, PA (US)

( * ) Notice: Subject to any disclaimer, the term of this patent is extended or adjusted under 35 U.S.C. 154(b) by 0 days.

(21) Appl. No.: 15/252,075

(22) Filed: Aug. 30, 2016

(65) Prior Publication Data

US 2017/0075546 A1    Mar. 16, 2017

Related U.S. Application Data

(63) Continuation-in-part of application No. 12/196,881, filed on Aug. 22, 2008, now Pat. No. 9,442,703.

(60) Provisional application No. 60/957,354, filed on Aug. 22, 2007.

(51) Int. Cl.

| | | |
|---|---|---|
| *G06F 3/048* | (2013.01) | |
| *G06F 3/0484* | (2013.01) | |
| *G06F 3/0488* | (2013.01) | |
| *G06T 11/60* | (2006.01) | |
| *G06F 9/44* | (2006.01) | |
| *G06F 3/01* | (2006.01) | |
| *G06F 17/27* | (2006.01) | |

(52) U.S. Cl.
CPC ........ *G06F 3/04845* (2013.01); *G06F 3/0488* (2013.01); *G06F 3/04842* (2013.01); *G06F 8/38* (2013.01); *G06T 11/60* (2013.01); *G06F 17/275* (2013.01); *G06F 2203/04104* (2013.01)

(58) Field of Classification Search
CPC . G06F 3/04845; G06F 3/04842; G06F 3/0488
See application file for complete search history.

(56) References Cited

U.S. PATENT DOCUMENTS

| | | | |
|---|---|---|---|
| 5,708,845 A | 1/1998 | Wistendahl | |
| 5,742,768 A | 4/1998 | Gennaro | |
| 5,801,687 A * | 9/1998 | Peterson | G11B 27/34 345/440 |
| 6,081,263 A | 6/2000 | LeGall | |
| 6,230,174 B1 | 5/2001 | Berger | |
| 6,476,834 B1 | 11/2002 | Doval | |
| 6,895,409 B2 * | 5/2005 | Uluakar | G06F 8/20 707/769 |
| 7,030,890 B1 * | 4/2006 | Jouet | G06F 9/4443 345/589 |
| 7,139,970 B2 | 11/2006 | Michaud | |

(Continued)

*Primary Examiner* — Nicholas Augustine

(57) ABSTRACT

The disclosure includes methods and systems for defining and generating graphics for one or more interactive elements to be used in an interactive user interface. Some embodiments include inputting into a graphical user interface a full screen graphic that includes an image illustrating a graphic in a first state. Embodiments may also include selecting an area of the image and defining the area as an interactive element. Additionally, some embodiments may include automatically linking tracking data to the interactive element for analytics and reporting.

20 Claims, 13 Drawing Sheets

(56) References Cited

U.S. PATENT DOCUMENTS

2002/0186257 A1\* 12/2002 Cadiz ............... G06F 17/30867
                                                                  715/838
2004/0243931 A1   12/2004 Stevens
2005/0160368 A1    7/2005 Liu
2007/0245264 A1   10/2007 Hoerentrup
2014/0059129 A1\*  2/2014 Chumbley ........ G06F 17/30876
                                                                  709/204

\* cited by examiner

DEFINING AND TRACKING AN INTERACTIVE USER INTERFACE

CROSS-REFERENCE TO RELATED APPLICATIONS

This application claims the benefit of and is a continuation-in-part of U.S. Nonprovisional patent application Ser. No. 12/196,881; filed Aug. 22, 2008; and entitled DEFINING AN INTERACTIVE USER INTERFACE. The entire contents of patent application Ser. No. 12/196,881 are incorporated by reference herein. U.S. Nonprovisional patent application Ser. No. 12/196,881 claims the benefit and priority of U.S. Provisional Patent Application No. 60/957,354; filed Aug. 22, 2007; and entitled DEFINING AN INTERACTIVE USER INTERFACE. The entire contents of Patent Application No. 60/957,354 are incorporated by reference herein.

BACKGROUND

Field

The invention relates generally to a method and system of defining and tracking an interactive user interface.

Description of Related Art

Interactive applications generally have a user interface comprised of interactive elements, such as buttons. The interactive elements often have multiple states that occur in response to various user actions. The interactive applications are generally constructed using a cut and paste technique.

Interactive applications are generally constructed by a method known as "cutting and placing." First, graphics creation and editing software, such as Adobe Photoshop®, is used to author the overall appearance and layout of the interface. Graphics for each state of each individual interactive element are created, usually by defining and cutting the element from an overall layout, and then saving as an individual file. For a two state element, such as a button, it is typically displayed in a normal state, but then displayed in a rollover state in response to mouse location. The author manually creates and saves at least one image for the rollover state of the button and a background image containing the normal image of the button at the correct geometric position. This method requires the cutting and placing of a large number of graphic files when the interactive interface is complex, such as when multiple interactive elements are desired. In certain instances, for an interface containing multiple elements having multiple states, the number of images "I" requiring creation would be at least $I=(E \times (S-1))+1$, where "E" is the number of interactive elements in the interface and "S" is the number of states (assuming all elements have the same number of states). Other instances require that a graphic be created for each state of each of the individual interactive elements. In these other instances, the number of graphics an author must create and manage increases to $I=(E \times S)+1$.

The second step of the construction process requires placement of the created images at their proper geometric position within the interface. To create the final interface, the author would usually need a second software application, such as Adobe® Flash®. Using these tools, the author can place an individual image for each state of each interactive element against a background graphic, trying to place the respective state image of the interactive element back in the exact, original location of the element within the overall layout. When individual graphic files are created and saved for each element at the cutting stage, the files only retain their size information, but not their positional information in relation to the overall interface from which the element was cut. Because of the lack of inherent positional information in the files, the author must manually line up each of the completed, individual pieces of graphics to achieve the intended look, oftentimes through multiple rounds of painstaking trial and error.

Finally, the graphic for each state of each interactive element must be assembled, and functionality defined, so that a pre-determined function is assigned to each state of each element in response to user input. Depending on the output platform, the defining can occur during reassembly of the element layers in the overall interface, or as a separate step. The entire process can be time-consuming and prone to error. If the author later decides to change an image for one or more states of one or more elements, or decides to add a state, the entire process of "cutting and placing," and defining and reassembly of the respective elements must be performed again. Accordingly, there is a need for systems and methods to remedy the deficiencies as described above.

SUMMARY

The present disclosure includes systems and methods implemented at least in part by a machine for defining and generating graphics for one or more interactive elements to be used in an interactive user interface. Methods can include inputting into a graphical user interface a first full screen graphic that includes a first image illustrating a graphic in a first state, and inputting into the graphical user interface a second full screen graphic that includes a second image illustrating the graphic in a second state. Methods can also include selecting a first area of the first image and a second area of the second image, and defining the first area as a first interactive element and the second area as a second interactive element. In some embodiments, methods include automatically linking a first data to the first interactive element and a second data to the second interactive element and storing geometric properties and positional information for the first area and the second area.

In some embodiments, the first data defines information associated with the first interactive element and the second data defines information associated with the second interactive element. Accordingly, methods can include retrieving the first data and the second data.

The first area of the first image can be located along an x-axis and a y-axis that is perpendicular to the x-axis. The second area of the second image can also be located along the x-axis and the y-axis. Accordingly, methods can include overlaying the first interactive element over the first area of the first image along a z-axis that is perpendicular to both the x-axis and the y-axis. As well, methods can include overlaying the second interactive element over the second area of the second image along the z-axis.

The first data can be automatically linked with the first interactive element regardless of a graphic associated with the first interactive element. Additionally, the second data can be automatically linked with the second interactive element regardless of the graphic associated with the second interactive element.

In some embodiments, the method includes inputting into a graphical user interface a third full screen graphic that includes a third image illustrating a graphic in a third state. Methods can even include automatically selecting a third area of the third image and defining the third area as the first interactive element. The third area of the third image can comprise identical geometric and positional data as the first area of the first image. Inputting into the graphical user interface the third full screen graphic can comprise automatically replacing the first full screen graphic with the third full screen graphic and automatically replacing the first area with the third area.

Methods can include inputting into the graphical user interface a fourth full screen graphic that includes a fourth image illustrating the graphic in a fourth state, and automatically selecting a fourth area of the fourth image and defining the fourth area as the second interactive element. The fourth area of the fourth image can comprise identical geometric and positional data as the second area of the second image. Inputting into the graphical user interface the fourth full screen graphic can comprise automatically replacing the second full screen graphic with the fourth full screen graphic and automatically replacing the second area with the fourth area. The method can include implementing the interactive user interface on a multi-touch interface on a handheld device. In some embodiments, at least one of the first state and the second state comprises at least one of a normal state, a mouse over state, a pressed state, and a disabled state.

The disclosure also includes a system for defining and generating graphics for one or more interactive elements to be used in an interactive user interface. The system can include a processor system and memory coupled to the processor system. The memory can comprise executable instructions that, when executed by the processor system, cause the processor system to effectuate operations comprising inputting into a graphical user interface a full screen graphic that includes an image illustrating a graphic in a first state, selecting an area of the image and defining the area as an interactive element, and automatically linking a tracking data to the interactive element.

In some embodiments, the executable instructions further cause the processor system to effectuate operations comprising storing geometric properties and positional information for the area. The tracking data can define information associated with the interactive element. The area of the image can be located along an x-axis and a y-axis that is perpendicular to the x-axis.

In some embodiments, the executable instructions further cause the processor system to effectuate operations comprising overlaying the interactive element over the area of the image along a z-axis that is perpendicular to both the x-axis and the y-axis. The tracking data can be automatically linked with the interactive element regardless of a graphic associated with the interactive element. The tracking data can define a language comprising at least one of English, Spanish, Chinese, Japanese, Portuguese, German, and Russian.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments. The above and other features of the present invention will become more apparent by describing in detail exemplary embodiments thereof with reference to the accompanying drawings, in which.

DETAILED DESCRIPTION

Figure 1:
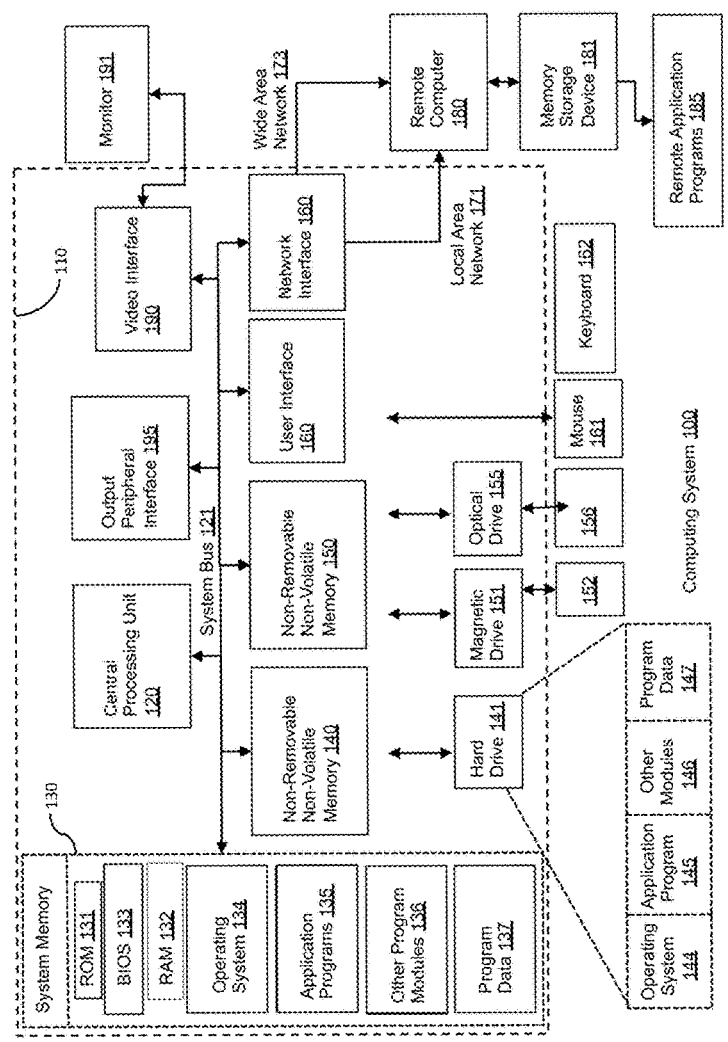
FIG. 1 illustrates a computing system in which the present invention can be implemented, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

The following discussion is intended to provide a brief general description of a suitable computing environment in which an example embodiment of the invention may be implemented. It should be understood, however, that handheld, portable, remote, and other computing devices of all kinds are contemplated for use in connection with the present invention. While a general-purpose computer is described below, this is but one example. The present invention also may be operable on any computing thin client having network server interoperability and interaction. Thus, an example embodiment of the invention may be implemented in an environment of networked hosted services in which very little or minimal client resources are implicated, e.g., a networked environment in which the client device serves merely as a browser or interface to the Internet.

Although not required, the invention can be implemented via an application programming interface (API), for use by a developer or tester, and/or included within the network browsing software, which will be described in the general context of computer-executable instructions, such as program modules, being executed by one or more computers (e.g., client workstations, servers, or other devices). Generally, program modules can include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), server computers, remote computing devices, handheld devices, laptop devices, multi-processor systems, microprocessor based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

Computing Systems

FIG. 1 illustrates a computing system environment 100 in which the invention may be implemented; although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With continued reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI-Express bus.

Computer 110 typically includes a variety of computer readable media, which can be any available media that can be accessed by computer 110, including volatile and non-volatile, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 may also include computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device can also connected to the system bus 121 via an interface, such as a video interface 190. In addition to monitor 191, computers may also include other peripheral output devices such as speaker(s) and printer(s) (not shown), which may be connected through an output peripheral interface 195.

The computer 110 may operate in a networked environment using logical connections to one or more remote computers, such as a remote computer 180. The remote computer 180 may include personal computers (e.g. laptops), servers, routers, network PCs, mobile devices, smartphones, tablets, smart watches, wearable devices, cellular phones, wireless devices, peer devices or other common network nodes, and the like. Additionally, the remote computer 180 typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 can be connected to the LAN 171 through a network interface or adapter 170. When used in a WAN networking environment, the computer 110 typically includes means for establishing communications over the WAN 173, such as the Internet. In a networked environment, program modules depicted relative to the computer 110, or portions thereof, may be stored in the remote memory storage device. By way of example, and not limitation, FIG. 1 illustrates remote application programs 185 as residing on memory device 181. Remote application programs 185 include, but not limited to, web server applications such as Microsoft® Internet Information Services® (IIS) and Apache HTTP Server, which can provide content residing on the remote storage device 181 or other accessible storage device to the World Wide Web. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Carving Station Embodiments

The present invention, also known as Carving Station, introduces a novel approach to the creation of interactive applications by uniquely organizing information and automating much of the process of defining an interactive user interface. Carving Station allows the automation process to be customized for any platform. In some embodiments, Carving Station provides a Design mode for composition of the interactive interface, and a Preview mode for visualization and validation of the created interactive interface.

Figure 2:
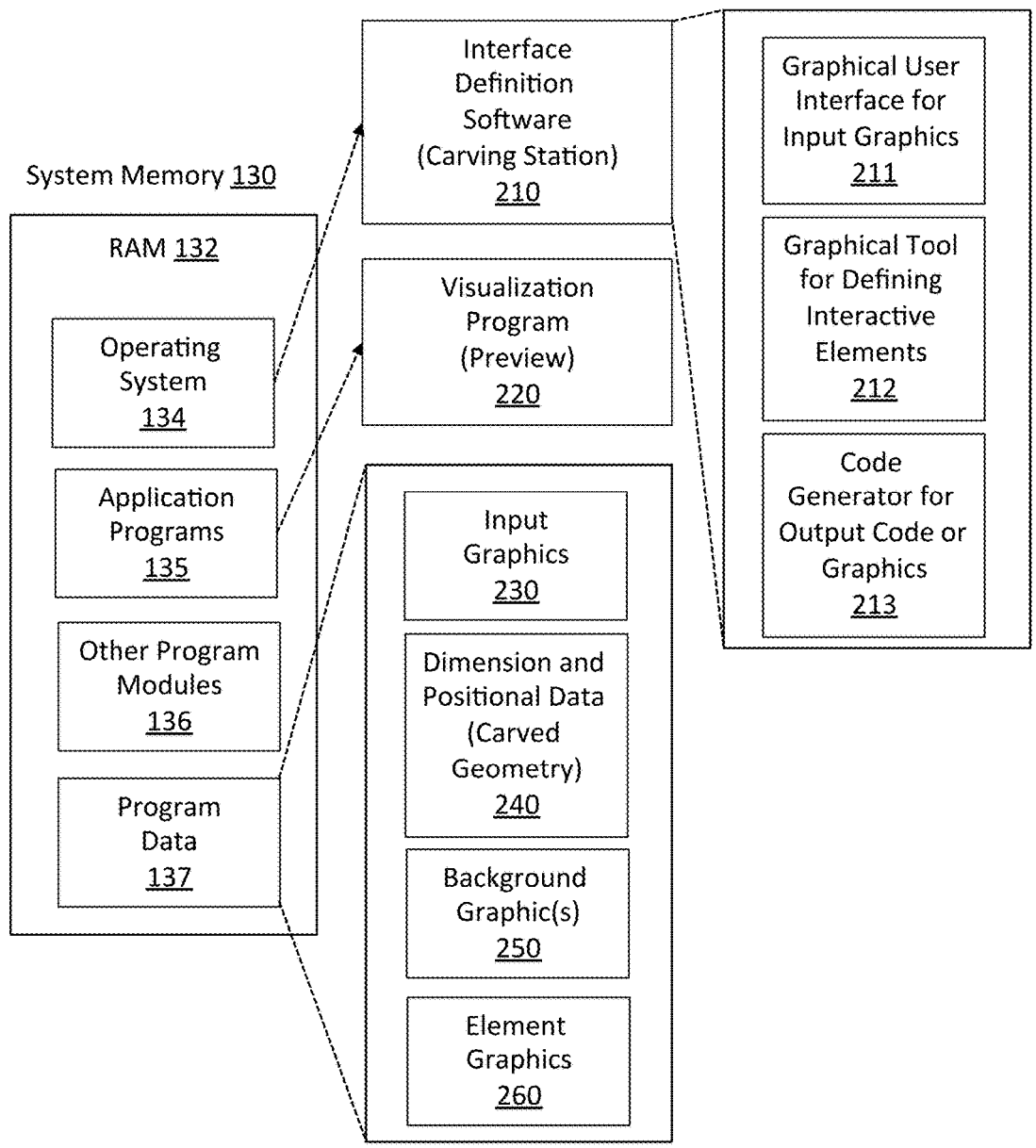
FIG. 2 illustrates an example of components of the present invention in system memory, according to some embodiments.

FIG. 2 illustrates components of Carving Station in system memory 130. According to such embodiments, Carving Station 210 resides in the system memory 130 as one of the application programs 135. A graphical user interface component 211 can be provided for inputting graphics, and a graphical tool 212 for the definition of interactive elements. Finally, a code generator 213 is provided for the generation of output codes and graphics. Other program modules 136, such as a visualization program 220, are provided for the visualization and validation of the composition, if needed. Program data 137 includes, but is not limited to, input graphics 230, dimensional and positional data of the defined interactive elements (Carved Geometry) 240, background graphic(s) 250, and output element graphics 260, if required by the selected output platform.

Figure 3:
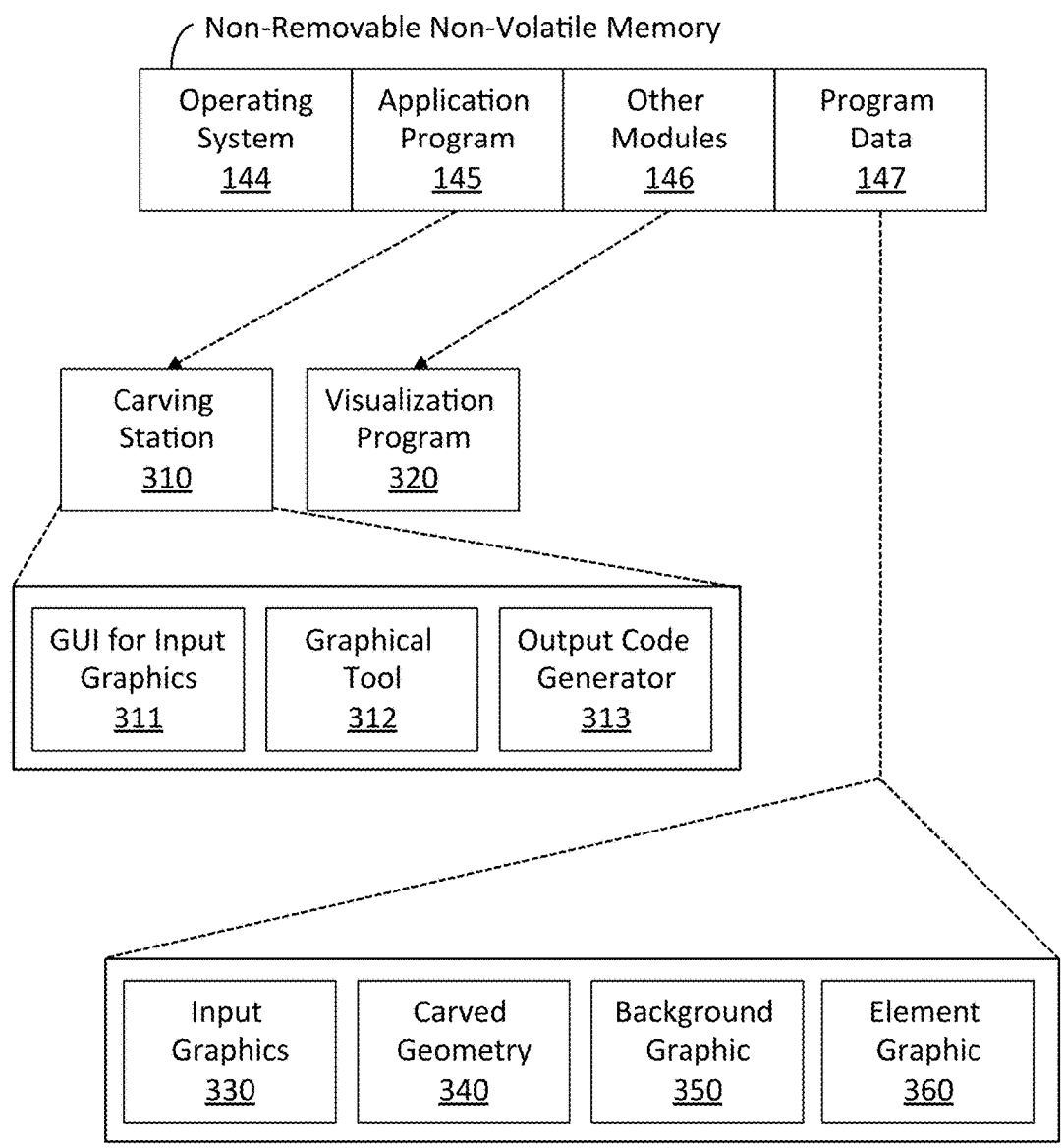
FIG. 3 illustrates an example of components of the present invention stored on a non-volatile computer readable media, according to some embodiments.

According to FIG. 3 some embodiments of the components of Carving Station, are stored on a non-volatile computer readable media device 141, such as a hard drive. The Carving Station program 310, and its components (graphical user interface for input graphics 311, graphical tool for defining interactive elements 312, and code generator for output code or graphics 313) are stored as an application program 145 on the computer readable media 141 and can be read into system memory 130 at run time. The computer readable media may also contain other program modules 146, such as a copy of the visualization program 320 for the visualization and validation of the composition. Program data 147, which can include, but is not limited to, input graphics 330, dimensional and positional data for the defined elements (Carved Geometry) 340, background graphic 350, and graphics for the interactive elements 360 if required by the output platform.

Figure 4:
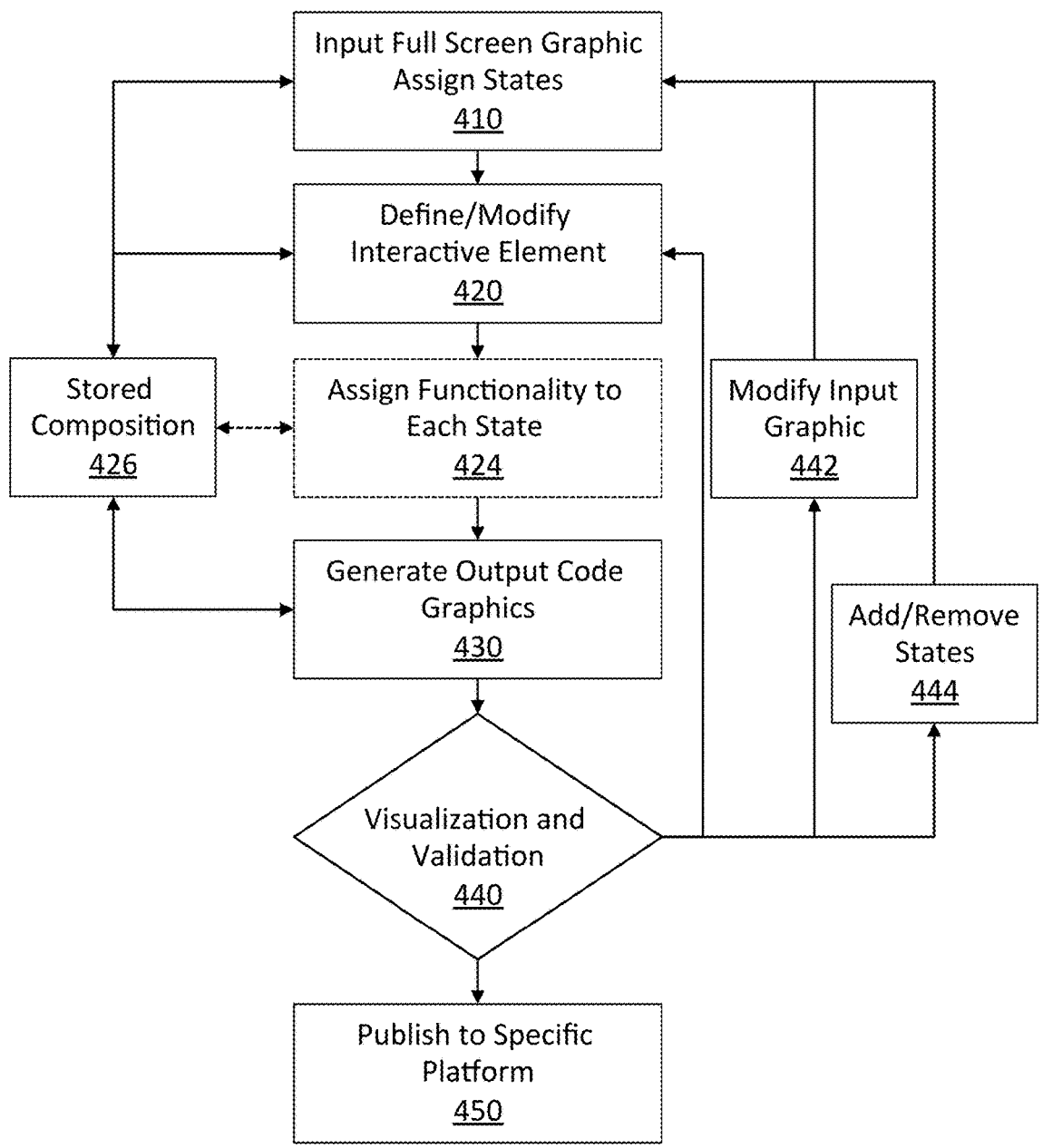
FIG. 4 illustrates a flow chart of method steps, according to some embodiments.

FIG. 4 illustrates a flow chart of various method steps of the present invention. In a platform generic embodiment of the invention, a computerized method for defining an interactive user interface can include inputting one full screen graphics of an interactive user interface for each state of the interactive user interface 410, defining and/or modifying an area within the interactive user interface for each of the one or more interactive elements 420, and automatically generating platform specific computer readable code enabling a graphic display of each state of each interactive element 430. Further, editing an interactive user interface already defined involves inputting one full screen graphics of the interactive user interface for each state of the defined interactive user interface to be revised 442 or added 444, defining and/or modifying an area within the interactive user interface for each interactive element to be added or revised 420; and automatically generating computer readable code enabling a graphic display of each state of each interactive element 430.

More specifically, the author first can decide on a layout of the interactive user interface, including the number of states for the interactive elements. Instead of inputting an individual graphic for each state of each element, as customarily done, the author can input one full screen graphics for each state 410, where the one full screen graphics contains all of the interactive elements displayed in the respective state. For example, for a rollover state, the author inputs only one full screen graphics, where the one full screen graphics shows each interactive element in its rollover state. A full screen graphics, as used herein, can refer to a graphic that occupies the entire intended display area of the interactive interface, or to a graphic of a portion of the interactive interface within which the interactive elements would reside.

Figure 5A:
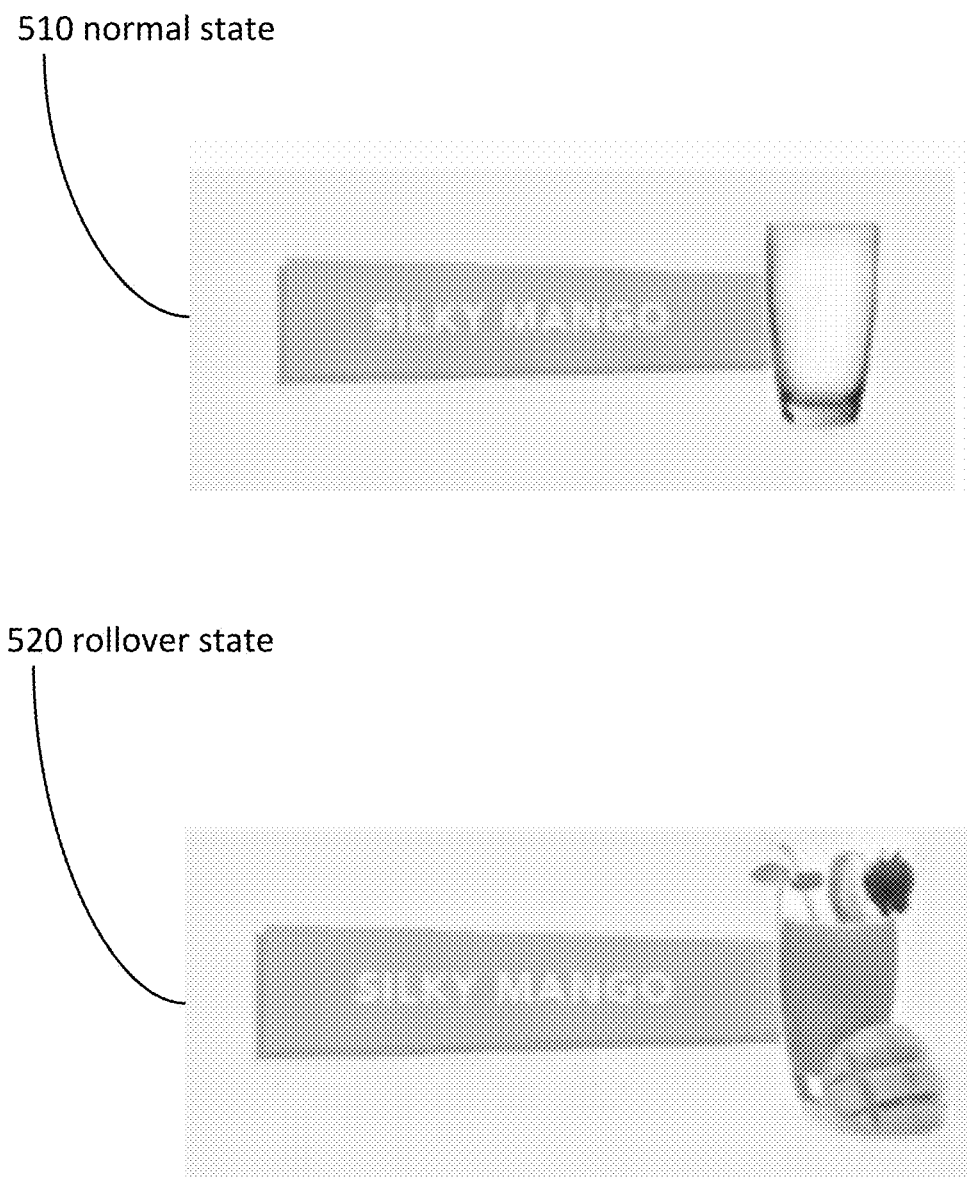
FIGS. 5A and 5B illustrate an example of "cutting and placing" methods, according to some embodiments.
Figure 5B:
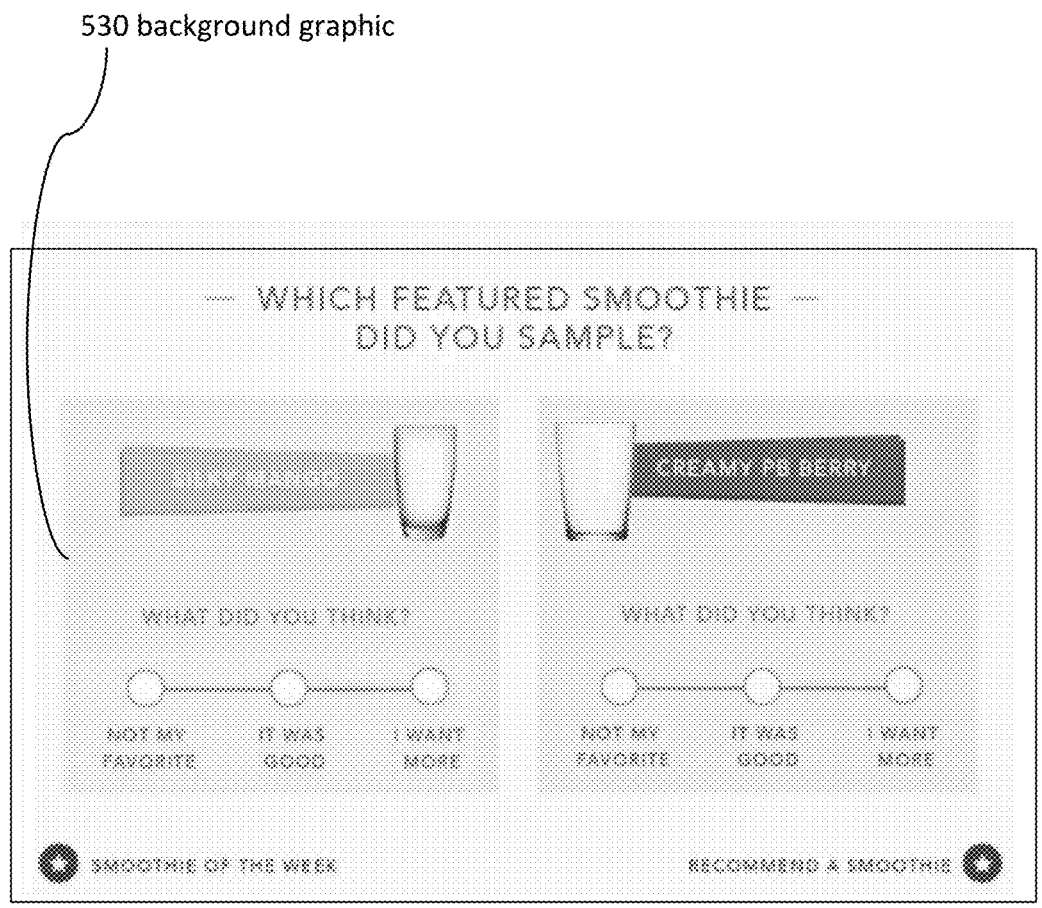
Figure 6A:
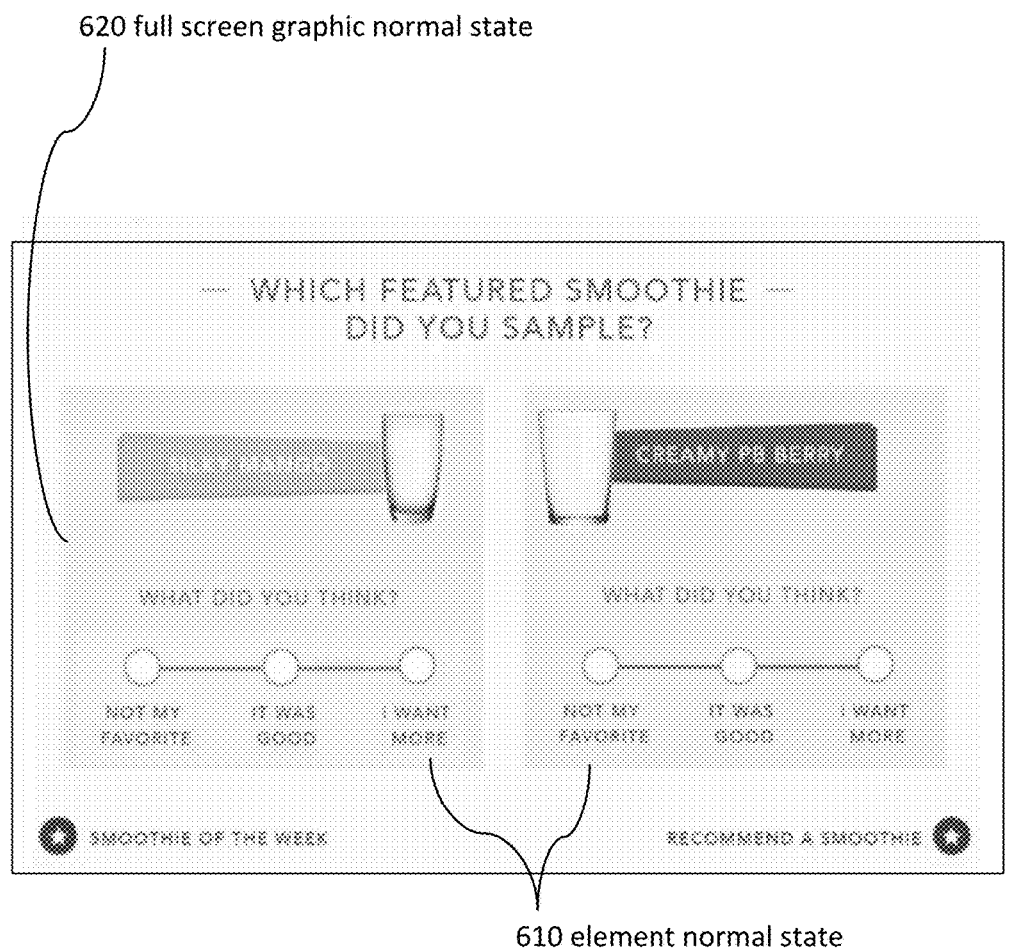
FIGS. 6A and 6B illustrate two full screen graphics used as input to generate the same interactive elements as shown in FIGS. 5A and 5B, according to some embodiments.
Figure 6B:
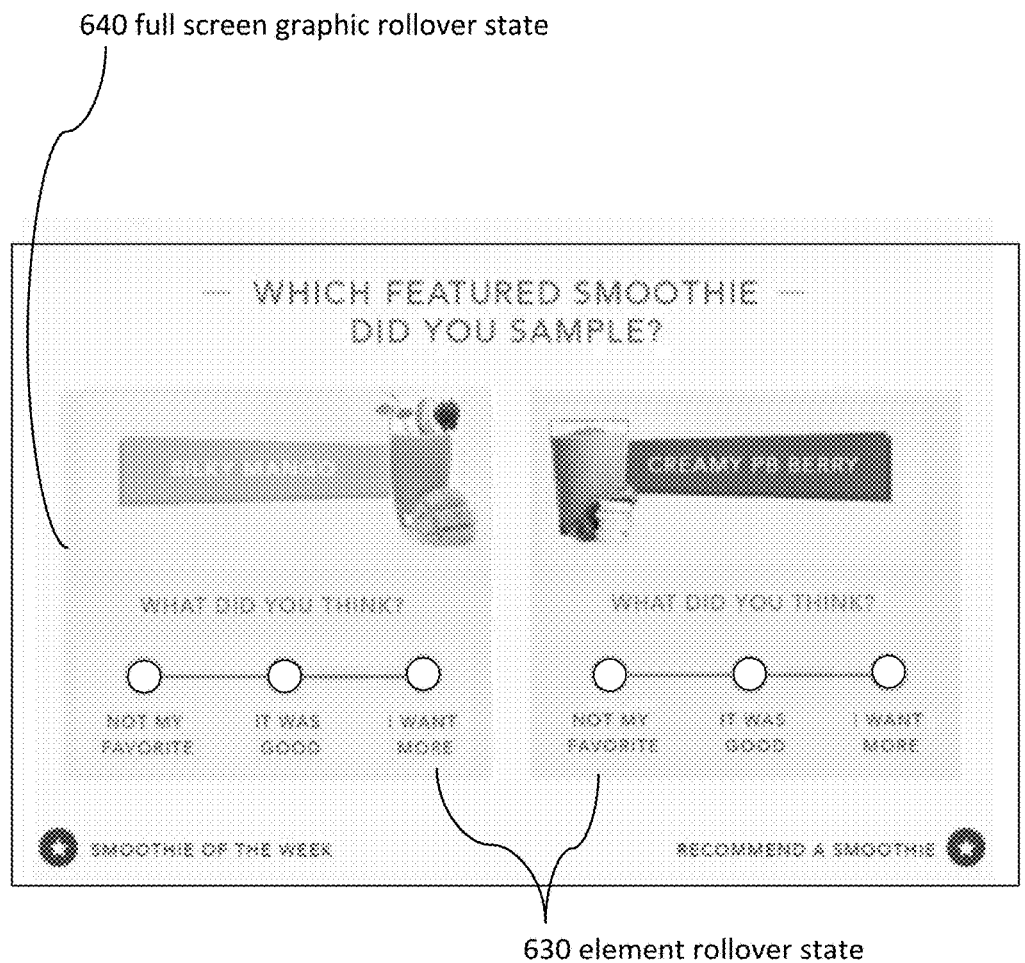

Accordingly, the number of images the author must create is equal to the number of states, I=E. Therefore, the present invention greatly reduces the number of individual data points, such as graphics and positional information, the author must supply and manage. FIGS. 5A and 5B illustrate an example of the prior art "cutting and placing" method. For an interface having six two-state buttons, a total of 13 individual graphics must be created (one graphic for each of six buttons for the normal state 510 (FIG. 5A), one graphic for each of six buttons for the rollover state 520 (FIG. 1A), and one background graphic 530 (FIG. 5B). FIGS. 6A and 6B illustrate two images input by the author in the present invention to generate the same six button two-state interface shown in FIGS. 5A and 5B. Using Carving Station, the author inputs only one full screen graphics for the normal state 620, which shows all elements in their normal state 610 (FIG. 6A), and one full screen graphics for the rollover state 640, which shows all elements in their rollover state 630 (FIG. 6B).

Figure 7:
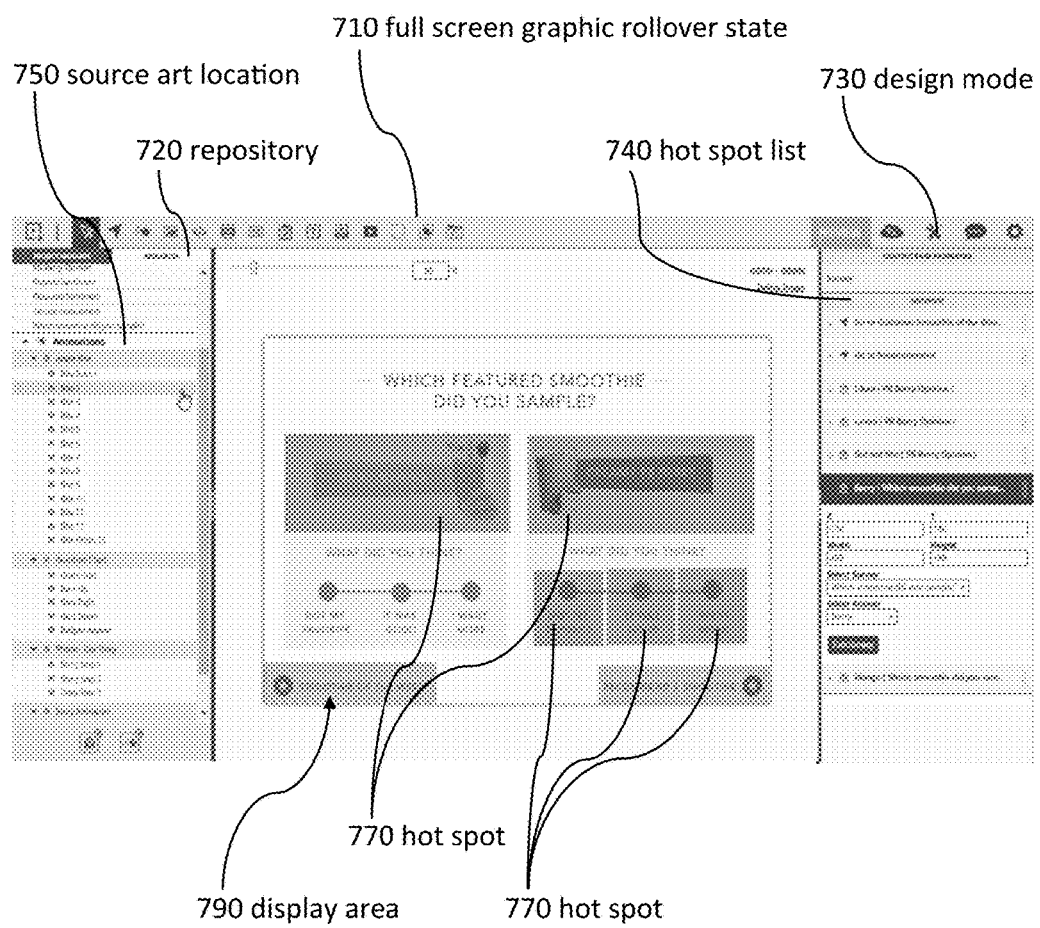
FIG. 7 illustrates a graphical interface of the invention in Design Mode, according to some embodiments.
Figure 8A:
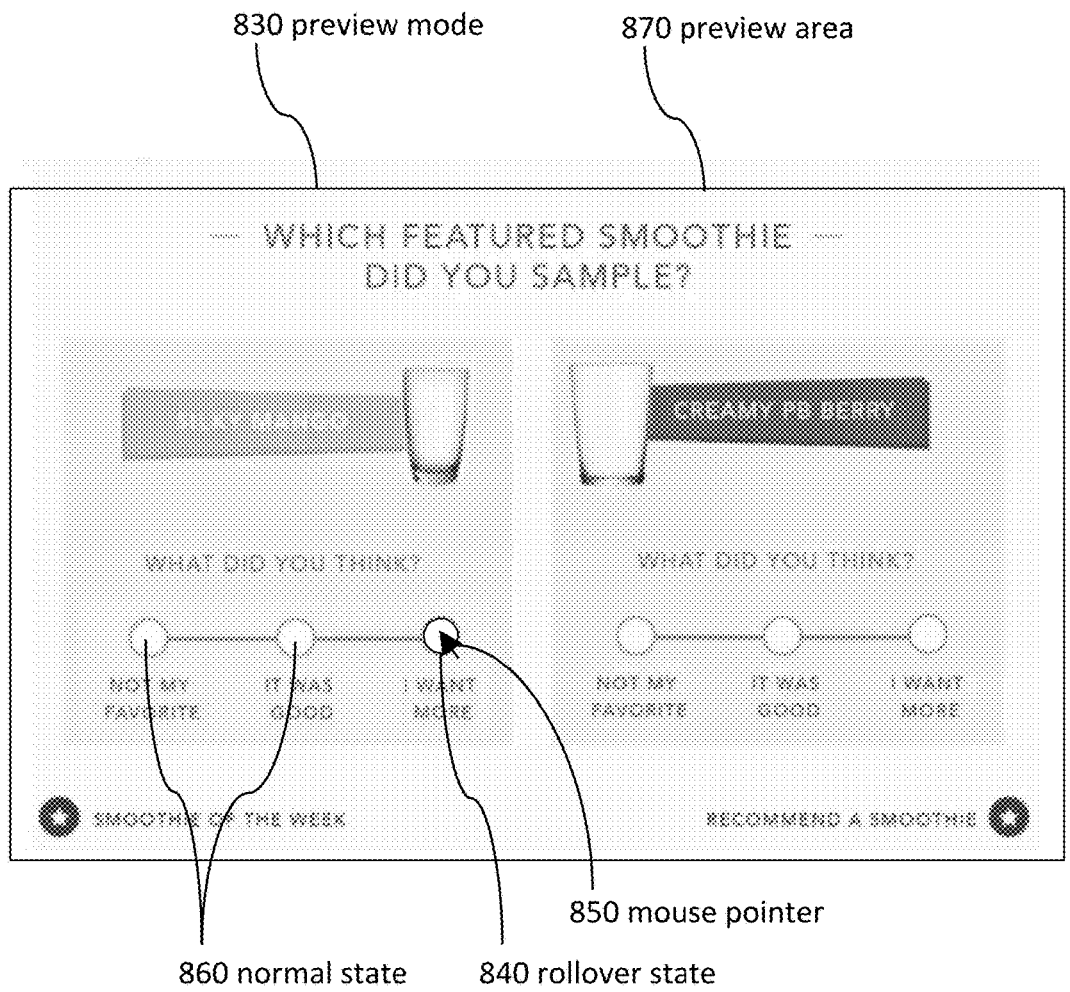
FIGS. 8A and 8B illustrate graphical interfaces of the invention in Preview Mode, according to some embodiments.
Figure 8B:
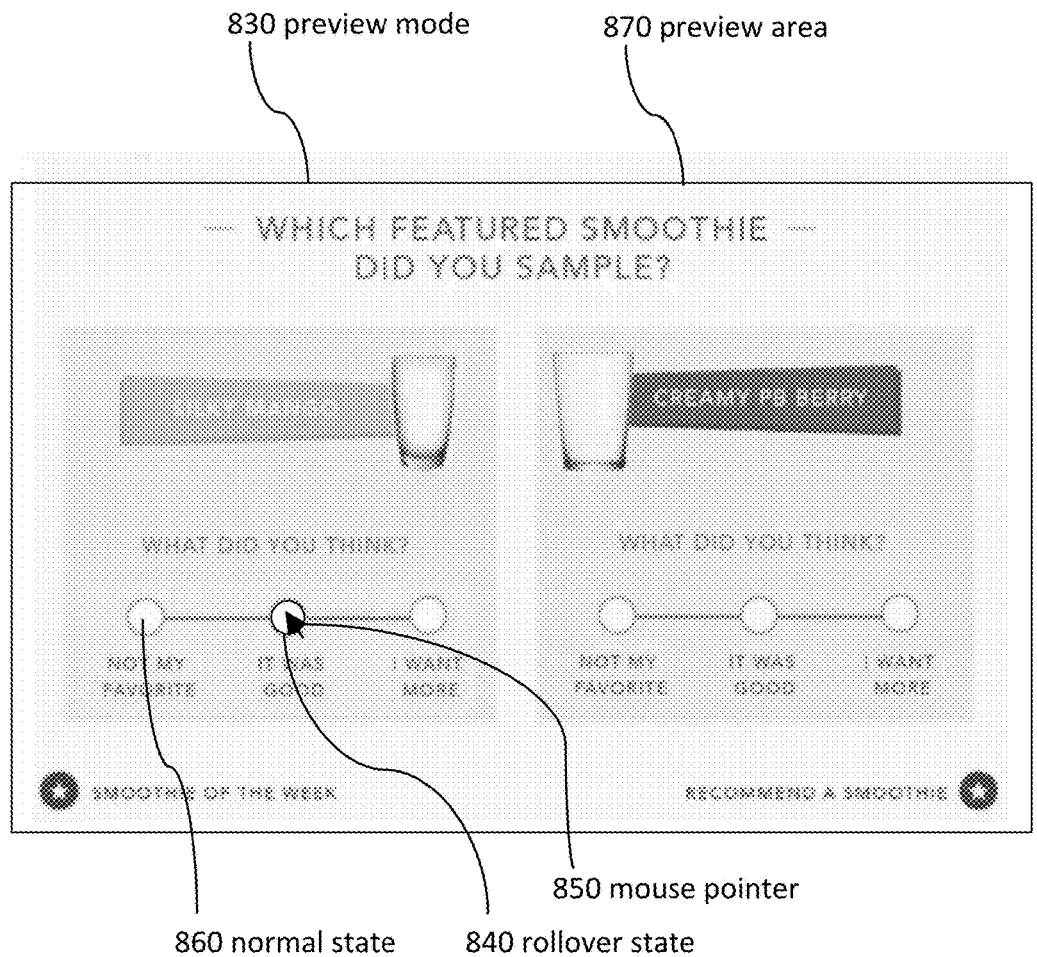

Referring now to FIG. 7, Carving Station provides a graphical user interface for the input graphics 311 in a Design mode 730. The author inputs each created full screen graphics into Carving Station, and assigns the graphic to its corresponding state 410. FIG. 7 illustrates a screen shot of the graphical user interface of embodiment 710 of the present invention in the design mode 730. In the FIG. 7 embodiment, Carving Station 710 is a stand-alone Windows application, although the present invention can be adapted for other applications, or as a component of a larger software package, such as Adobe Photoshop®, Flash®, or Microsoft® Visual Studio®. In some embodiments, Carving Station 710 is implemented through a .NET application running on a server in combination with a connected browser client application implemented in Javascript using REST service calls. As shown in FIG. 7, the interface can provide the author an option to select between the Design mode 730 and a Preview Mode 830 (FIGS. 8A and 8B). The author can also designate a location for Source Art 750, where the full screen graphics (input graphics 330) can be located. A file name for each full screen graphics can be entered into the corresponding space for each respective layer (each included state representing a layer). The full screen graphics are displayed as layers in a display area 790. In one embodiment of the invention, Carving Station 710 provides four state layers (Normal, Mouse Over (i.e., Rollover), Pressed, and Disabled). In the example illustrated in FIG. 7, only two states are used (Normal and Mouse Over), with the unused states left blank. The author can also designate a location for the collection of the output files, such as: store to Repository 720; File System; Oracle® Database; SQL Server database; and Microsoft® Content Manager Server. The output files can be made compatible with various formats, such as: Adobe® Flash® Movie; PowerPoint® file; HTML Page; and Microsoft® Sharepoint® server; etc.

As a final author step in the design process of the present invention, the author uses tools provided by Carving Station 212 to graphically identify areas on the full screen graphics corresponding to the desired individual interactive elements 420. In the example of FIG. 7, the individual elements, Hot Spots 770, are defined as rectangles. The areas selected (Hot Spots 770) to define the interactive elements are highlighted in a different color. Each Hot Spot is assigned a name, and is displayed in a list 740. All of the interactive elements for all of the states (or layers) are defined at the same time. The size and positional information of each interactive element in relation to the full screen graphics (Carved geometry) 240, is inherent to the definition of the geometrical area that represents each interactive element, and is recorded and saved when defined by the author. Therefore, the customary need to retain positional information externally is eliminated, along with the requirement of placing (or replacing) the elements manually through trial and error.

At any time during the interactive interface defining process, the author can define and save an entire composition 426, including all of the graphics and all of the positional and size information of the interactive elements, to a computer readable media 147. Functionality for each state of each of the interactive element can be assigned during element definition, or as a separate step at a later time 424. If the author later desires to change the look of a state, all the author needs to do is input a full screen graphics incorporating the desired change 442, replacing the original graphic associated with the respective state. The present invention then detects that a source graphic has changed and automatically updates the composition. The author could then store the updated composition. If an author desires to add states to an already defined interface, the author merely inputs one full screen graphics for each state the author would like to add 444, and associates the respective full screen graphics with the proper state. If the author desires to add an interactive element, the author merely identifies an area on the full screen graphics for the interactive element to be added 420. A name is assigned to the newly added element 740, and the size and positional information of the added interactive element is automatically recorded and saved 426. Accordingly, there is no need to supply, manage and place numerous graphics, or to define and reassemble every element layer in the interactive user interface. Since the design process of the present invention is platform independent, the author needs focus only on aesthetics of the interface, with no concern to platform specific coding.

Preview mode 830 (FIGS. 8A and 8B) enables the author to visualize and validate the interactive interface designed 440. In a preferred embodiment, a specific platform is selected by the author at the beginning of the design process. When the Preview mode 830 is selected, the Carving Station, using the dimension and positional information (Carved geometry) 240 and supplied source graphics 230, automatically generates graphics and code specific for the selected platform 430. The interactive interface designed by the author is previewed as native code for the platform of intended interactive interface publication. For example, if the author chooses to publish the final interactive interface as a regular web page, Carving Station would automatically generate graphics for the individual interactive elements. Because the composition retains both positional and size information of the element graphics, Carving Station can then automatically generate an HTML file that references graphics containing the correct layout of the respective interactive elements. There is no need for the author to input or adjust the positional information manually. In one embodiment, an instance of the appropriate viewer for the platform selected is invoked within the Carving Station Preview window. In the example of an HTML webpage, the Internet Explorer® Web Browser Control is used. Carving Station can easily output interactive interfaces conforming to other platforms, such as Microsoft® .NET, PowerPoint®, Adobe® Flash®, Android®, IOS®, and Windows® UWP without any alteration to the design process. When the author is satisfied with the interactive interface designed, the author can instruct Carving Station to "publish" the interactive interface 450. All corresponding graphics and codes are automatically generated by Carving Station and stored in the author defined output destination, such as a repository directory 720.

FIGS. 8A and 8B illustrate a screen shot of Carving Station 710 in the Preview mode 830. In the FIGS. 8A and 8B illustration, the interactive interface created and shown in FIG. 7 is displayed in the preview area 870. Two views of the Preview mode 830 (FIGS. 8A and 8B, respectively) are shown to demonstrate the interactivity defined by the author. In FIG. 8A, the mouse pointer 850 is placed on top of the first element, and the first button is displayed in the rollover state 840, while the rest of the elements remain displayed in the normal state 860. In FIG. 8B, the mouse pointer 850 is placed on top of the second element, and the second element is displayed in the rollover state 840, while the first, third, fourth and fifth elements are displayed in the normal state 860.

In some embodiments, a display is generated by the automated operation of file creation after author completion of the two step creation process (i.e., after author creation of a full screen graphics for each desired state, and after geometric identification of each interactive element). After author input of a full screen graphics for each state, and author definition (identification) of positional information for each interactive element, Carving Station automatically generates an image file for each state of each element. Accordingly, Carving Station automatically generates the multiple images, and records the respective positional information, once painstakingly created by the user through the "cutting and placing" process. For instance, in the FIGS. 5A and 5B example, for an interface having five two-state buttons, Carving Station will automatically generate the ten individual graphics (i.e., one graphic for each of five buttons for the normal state 510 and one graphic for each of five buttons for the rollover state 520) after author input of one full screen graphics for the normal state and one full screen graphics for the rollover state, and after author identification of the five interactive elements. So, as shown in FIG. 8B, when the mouse pointer 850 is placed on top of the second element, the present invention retrieves the automatically generated file for the second element in the rollover state 840 and accordingly displays that image in the second element location of the preview area 870.

In further embodiments of the present invention, such displays occur alternatively. For instance, rather than automatically generate and later retrieve the specific image for the rollover state 840 of the second element in the FIG. 8B example, the present invention could reference the full screen graphics created and stored for the rollover state, and present the respective portion thereof, as previously defined by the author for the second element, when the mouse pointer is placed on top of the second element, as in the FIG. 8B example. An additional alternative embodiment would have the full screen graphics for the normal state displayed in the preview area 870 (for instance, a look similar to that in FIG. 5B) and when the mouse pointer 850 is placed on top of the second element, as in the FIG. 8B example, the present invention essentially cuts out the second element, as previously positionally defined by the author, to reveal the full screen graphics for the rollover state, existing as an underlying layer. Since only the positional location of the second element has been removed, the only portion of the full screen graphics for the rollover state visible to the user is the second element portion.

Accordingly, Carving Station can greatly reduce the number of individual data points and graphic files that an author must supply and manage, eliminating the need for the author to manually define and reassemble each element layer to achieve the final interactive interface. Alteration and addition of elements using Carving Station does not require that the author repeat the "cutting and placing" steps, or repeat the defining and reassembly of each element layer in the interface.

Tracking Embodiments

Figure 9:
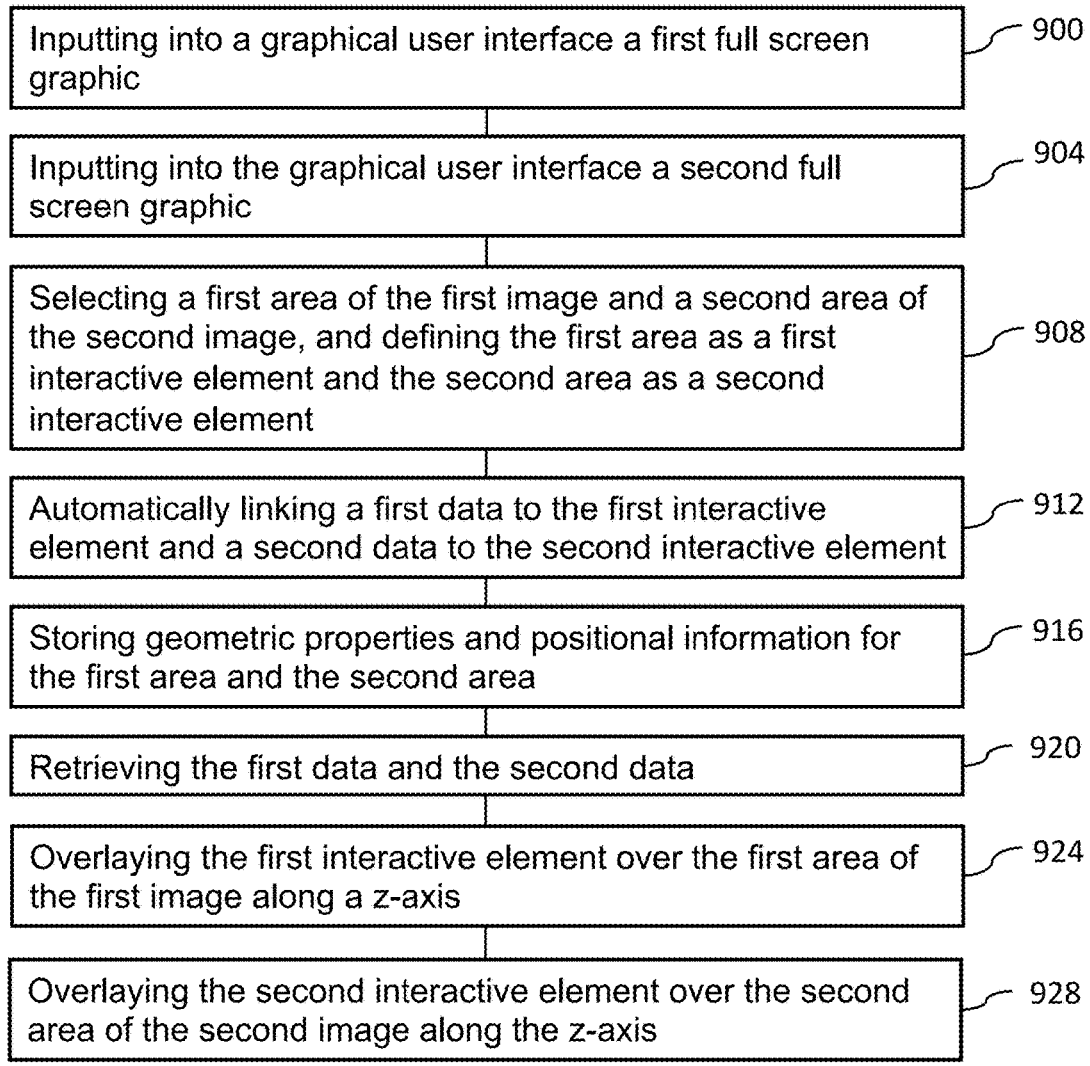
FIGS. 9 and 10 illustrate flow-charts of various methods, according to some embodiments.
Figure 10:
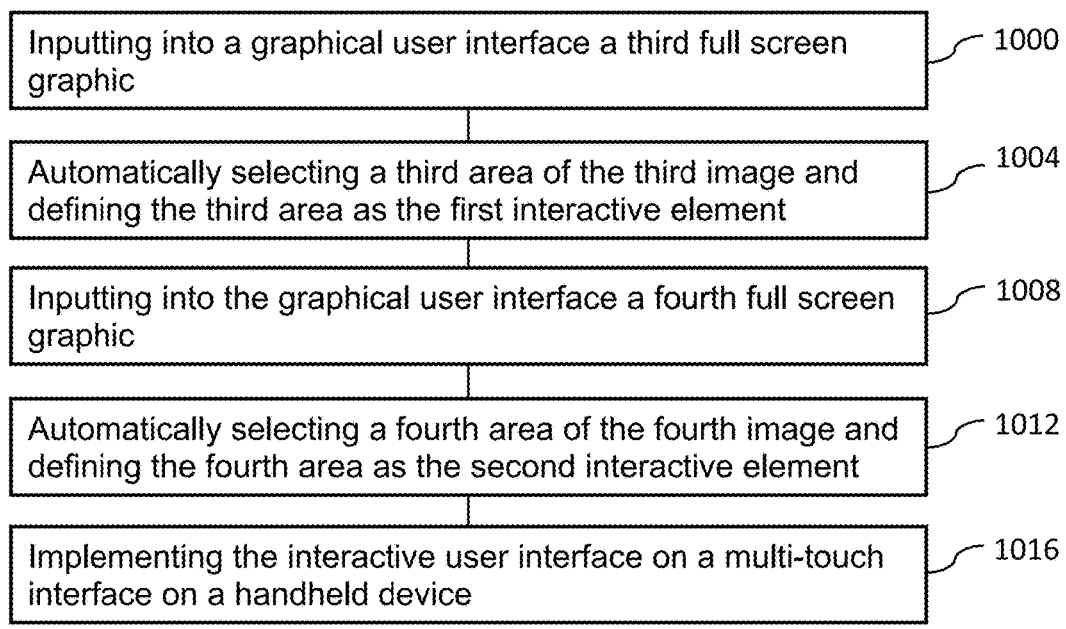

Embodiments of the present invention may include systems and methods that allow interactions with the application to be tracked and defined according to parameters as specified by the author. As shown in FIG. 9, methods may include inputting into a graphical user interface a first full screen graphic that includes a first image illustrating a graphic in a first state (at step 900) and inputting into the graphical user interface a second full screen graphic that includes a second image illustrating the graphic in a second state (at step 904). Methods may also include selecting a first area of the first image and a second area of the second image, and thereby defining the first area as a first interactive element and the second area as a second interactive element (at step 908). In order to track specific actions and interactions with the invention, methods may also include automatically linking a first data to the first interactive element and a second data to the second interactive element (at step 912).

Additionally, some embodiments may include storing geometric properties and positional information for the first area and the second area (at step 916). The first area of the first image can be located along an x-axis and a y-axis that is perpendicular to the x-axis. Additionally, the second area of the second image can also be located along the x-axis and the y-axis.

The first data can define information associated with the first interactive element and the second data can define information associated with the second interactive element. In order to track events and actions associated with each of the respective first and second interactive elements, the author of the system may recall the first and second data to interpret and decipher user interactions with the invention. Accordingly, methods may further include retrieving the first data and the second data (at step 920).

In some embodiments, the method includes overlaying the first interactive element over the first area of the first image along a z-axis that is perpendicular to both the x-axis and the y-axis (at step 924). As well, methods can include overlaying the second interactive element over the second area of the second image along the z-axis (at step 928).

Because the invention can reduce the number of steps required to change input graphics, the first data can be automatically linked with the first interactive element regardless of a graphic associated with the first interactive element. As well, the second data can be automatically linked with the second interactive element regardless of the graphic associated with the second interactive element.

Methods may also include inputting more than two full screen graphics, such as graphics that may be used to represent a third state, a fourth state, a fifth state, and the like. For example, methods include inputting into a graphical user interface a third full screen graphic that includes a third image illustrating a graphic in a third state (at step 1000). Accordingly, methods may include automatically selecting a third area of the third image and defining the third area as the first interactive element (at step 1004).

In some embodiments, the third area of the third image comprises identical geometric and positional data as the first area of the first image. As such, inputting into the graphical user interface the third full screen graphic can comprise automatically replacing the first full screen graphic with the third full screen graphic and automatically replacing the first area with the third area.

Methods may also include inputting into the graphical user interface a fourth full screen graphic that includes a fourth image illustrating the graphic in a fourth state (at step 1008). As well, methods may include automatically selecting a fourth area of the fourth image and defining the fourth area as the second interactive element (at step 1012). The fourth area of the fourth image can comprise identical geometric and positional data as the second area of the second image. Accordingly, inputting into the graphical user interface the fourth full screen graphic comprises automatically replacing the second full screen graphic with the fourth full screen graphic and automatically replacing the second area with the fourth area.

It should be appreciated that the interactive user interface can be implemented on a variety of devices. For example, in some embodiments, the interactive user interface can be implemented on a multi-touch interface on a handheld device (at step 1016), such as a smartphone, tablet, smart watch, and the like.

The tracking data can define any type of written or spoken language. In some embodiments, the tracking data defines English, Spanish, Chinese, Japanese, Portuguese, German, Russian, and the like.

Interpretation

It should be appreciated that the phrase "Carving Station" can be used interchangeably with other terms, such as "Studio". Generally, "Carving Station" and "Studio" are phrases and terms that can change as the industry and technology evolve.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions The following is claimed:

1. A method implemented at least in part by a machine for defining and generating graphics for one or more interactive elements to be used in an interactive user interface, the method comprising:
   inputting into a graphical user interface a first full screen graphic;
   inputting into the graphical user interface a second full screen graphic;
   selecting an area that represents an interactive element of the first full screen graphic and the second full screen graphic;
   defining a first state and a second state of the interactive element, wherein the first state illustrates at least a portion of the first full screen graphic and the second state illustrates at least a portion of the second full screen graphic;
   and
   automatically linking first data and second state data to the interactive element based upon the area.

2. The method of claim 1, further comprising storing geometric properties and positional information for the area that represents the interactive element of the first full screen graphic and the second full screen graphic.

3. The method of claim 2, further comprising retrieving the first data and the second data.

4. The method of claim 3, wherein the area is located along an x-axis and a y-axis that is perpendicular to the x-axis.

5. The method of claim 4, further comprising
   overlaying the interactive element over the area along a z-axis that is perpendicular to both the x-axis and the y-axis.

6. The method of claim 3, further comprising inputting into the graphical user interface a third full screen graphic.

7. The method of claim 6, further comprising
   automatically selecting an area that represents an interactive element of the third full screen graphic; and
   defining a third state of the interactive element, wherein the third state illustrates at least a portion of the third full screen graphic.

8. The method of claim 7, wherein the area that represents the interactive element of the third full screen graphic defines identical geometric and positional data as the area that represents the interactive element of the first full screen graphic.

9. The method of claim 8, wherein inputting into the graphical user interface the third full screen graphic comprises automatically replacing the first full screen graphic with the third full screen graphic and automatically replacing the area that represents the interactive element of the first full screen graphic with the area that represents the interactive element of the third full screen graphic.

10. The method of claim 7, further comprising:
    inputting into the graphical user interface a fourth full screen graphic; and
    automatically selecting an area that represents an interactive element of the fourth full screen graphic.

11. The method of claim 10, wherein the area that represents the interactive element of the fourth full screen graphic defines identical geometric and positional data as the area that represents the interactive element of the second full screen graphic.

12. The method of claim 11, wherein inputting into the graphical user interface the fourth full screen graphic comprises automatically replacing the second full screen graphic with the fourth full screen graphic and automatically replacing the area that represents the interactive element of the second full screen graphic with the area that represents the interactive element of the fourth full screen graphic.

13. The method of claim 2, further comprising implementing the interactive user interface on a multi-touch interface on a handheld device.

14. The method of claim 2, wherein at least one of the first state and the second state comprises at least one of a normal state, a mouse over state, a pressed state, and a disabled state.

15. A system for defining and generating graphics for one or more interactive elements to be used in an interactive user interface, the system comprising:
    a processor system;
    memory coupled to the processor system, the memory comprising executable instructions that, when executed by the processor system, cause the processor system to effectuate operations comprising:
       inputting into a graphical user interface a first full screen graphic;
       inputting into the graphical user interface a second full screen graphic;
       selecting an area that represents an interactive element of the first full screen graphic and the second full screen graphic;
       defining a first state and a second state of the interactive element, wherein the first state illustrates at least a portion of the first full screen graphic and the second state illustrates at least a portion of the second full screen graphic; and
       automatically linking first data and second state data to the interactive element based upon the area.

16. The system of claim 15, wherein the executable instructions further cause the processor system to effectuate operations comprising storing geometric properties and positional information for the area.

17. The system of claim 16, wherein the first data and the second data define information associated with the interactive element, and wherein the area is located along an x-axis and a y-axis that is perpendicular to the x-axis.

18. The system of claim 17, wherein the executable instructions further cause the processor system to effectuate operations comprising overlaying the interactive element over the area along a z-axis that is perpendicular to both the x-axis and the y-axis.

19. The system of claim 18, wherein the first data and the second data are automatically linked with the interactive element regardless of a graphic associated with the interactive element.

20. The system of claim 19, wherein the first data and the second data define a language comprising at least one of English, Spanish, Chinese, Japanese, Portuguese, German, and Russian.

* * * * *